Aug. 2, 1932.  L. S. BROWN  1,869,932
STRIP GASKET
Filed Nov. 9, 1929
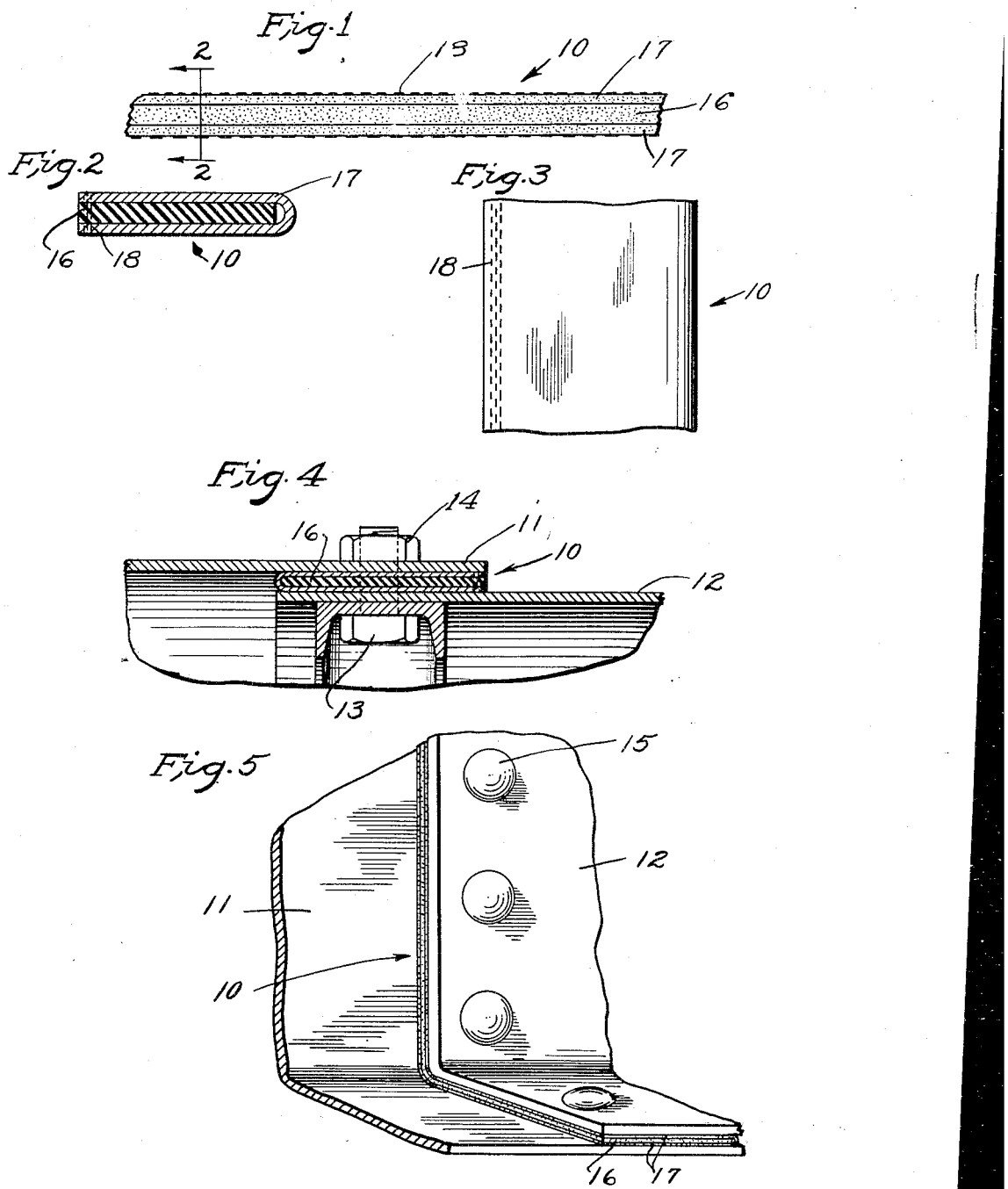

Patented Aug. 2, 1932

1,869,932

UNITED STATES PATENT OFFICE

LOUIS S. BROWN, OF LOS ANGELES, CALIFORNIA

STRIP GASKET

Application filed November 9, 1929. Serial No. 405,987.

This invention relates to means for packing and calking joints, and particularly pertains to a strip packing gasket.

In the construction of steel tanks and the like, it is common practice to build a composite tank wall made from steel plates assembled in courses, the courses being securely bolted together, one upon the other, and the overlapping contiguous edges of the plates being permanently fastened by rivets or temporarily fastened by bolts, in which latter instance it is possible to knock down the tank and re-assemble it. In such structures it is desirable to interpose a packing member which will be impervious to the action of the liquid confined by the tank, and will be of a resilient character to insure that when the fastening members, such as rivets or bolts are secured in position, will be leak proof.

It has been common practice to cut strips of rubber "on the job", and to use these for gaskets. These, however, have had the objection of deterioration under the action of the liquids contained within the tanks, and have not remained permanently leak proof. It is the object of the present invention, therefore, to provide a resilient packing strip which will insure a tight joint between the clamp plates, and which will also be impervious to the action of the liquids, such as oil, to produce a substantially permanent leak proof joint between the members.

The present invention contemplates the provision of a rubber strip enclosed within a folded piece of fabric which is impervious to the action of oil and its chemical contents, and which strip is fabricated in its assembled condition, and need only be cut into required lengths as the tank is built.

The invention is illustrated by way of example in the accompanying drawing, in which:

Fig. 1 is a view showing the edge of the strip packing gasket with which the present invention is concerned.

Fig. 2 is a view in transverse section through the gasket as seen on the line 2—2 of Fig. 1.

Fig. 3 is an enlarged fragmentary view in elevation showing the gasket.

Fig. 4 is a fragmentary view in section showing a joint between overlapping plates of a tank, or the like, and disclosing the manner in which the gasket is placed in position.

Fig. 5 is a fragmentary view in perspective showing another application of the strip gasket to the overlapping joints of the plates.

Referring more particularly to the drawing, 10 indicates a packing gasket, here shown as disposed between overlapping plates 11 and 12. These plates may be secured together by bolts 13 having nuts 14, or by rivets 15.

It is understood that the present invention is not concerned with the manner of fastening the plates, but with means for packing the joints between the plates. This is accomplished by the gasket 10 which, as shown in Fig. 2 of the drawing, comprises a resilient strip 16 and a sheathing 17. The resilient strip may be of any desired material, but is here shown as being constructed of rubber of sufficient thickness to permit it to be compressed when the plates 11 and 12 are drawn together.

The sheathing strip 17 may be constructed of any material which is impervious to the action of the liquids confined within the tank, and when used in connection with oil tanks is impervious to the action of the oil and the active contents thereof. The strip 17 as here shown is preferably a sheet of thin cardboard or heavy paper which has been properly treated to make it impervious to the action of petroleum oils. This sheet is folded upon itself so that the strip of rubber may be embraced by it and confined by its folded halves. It is not necessary that the free edges of the strip be fastened in any way with relation to each other and the rubber, but in order to fabricate the strip and to render it easy to handle, both as an article of merchandise and when applying it to a joint, it is desirable to form a row of stitching 18 through the free edges of the sheathing strip and the intervening edge of the packing strip 16, so that these members will at all times remain in their assembled condition.

In applying the strip gasket 10, it is only necessary to cut it into desired lengths and to interpose it between the contiguous overlapping faces of the plates, or other members forming a joint, with the folded edge of the sheathing strip facing the interior of the tank, and being exposed to the contents thereof. This insures that the rubber packing strip 16 which would otherwise be attacked by the oil and its chemical contents will be completely protected from this chemical action, and the liquid contents of the tank will be excluded from the joint.

The fastening bolts 13 and the rivets 15 may be drawn tightly against the plate and will cause the rubber packing strip 16 to be compressed so that the joint will be tightly packed.

It will thus be seen that by the use of this construction packing strips may be conveniently handled on the job and readily placed into their packing position where they will provide the double function of a resilient packing strip which will mechanically form a tight joint between the two clamped plates, and a protecting member which will prevent the contents of the tank from attacking the resilient member and deteriorating the same.

While I have shown the preferred form of my invention as now known to me, it will be understood that various changes may be made in combination, construction, and arrangement of parts by those skilled in the art without departing from the spirit of my invention as claimed.

Having thus described my invention, what I claim and desire to secure by Letters Patent is:

A strip packing gasket adapted to be interposed between contiguous faces of members forming an overlapping joint which comprises a flat strip of rubber having covering of a material impervious to the action of oil and the like, said covering being in the form of a flat sheet of fibrous material folded upon itself to embrace the flat rubber strip, the line of fold occurring in the joint and facing the interior of the container in which the joint occurs, and the free edges of the material being stitched together by a line of stitching passing through the material and the rubber strip.

LOUIS S. BROWN.